United States Patent [19]

Bell et al.

[11] 4,213,244
[45] Jul. 22, 1980

[54] COORDINATE MEASURING MACHINE HAVING A FAILSAFE PROTECTION SYSTEM

[75] Inventors: Frederick K. Bell, Centerville; John J. Tuss, Englewood, both of Ohio

[73] Assignee: The Bendix Corporation, Southfield, Mich.

[21] Appl. No.: 904,172

[22] Filed: May 8, 1978

[51] Int. Cl.² ............................................. G01B 5/20
[52] U.S. Cl. ............................. 33/1 M; 33/174 R; 188/67; 188/170
[58] Field of Search ............... 33/1 M, 174 R, 174 P, 33/174 L; 188/67, 129, 170

[56] References Cited

U.S. PATENT DOCUMENTS

| 722,894 | 3/1903 | Potter | 188/67 |
|---|---|---|---|
| 3,597,016 | 8/1971 | Gachot | 188/67 |
| 3,783,976 | 1/1974 | Kerr | 188/67 |
| 3,818,596 | 6/1974 | Stemple et al. | 33/1 M |
| 3,972,392 | 8/1976 | Johnson | 188/170 |

Primary Examiner—Willis Little
Attorney, Agent, or Firm—Kenneth A. Seaman

[57] ABSTRACT

A coordinate measuring machine having an automatic failsafe protection system. The coordinate measuring machine (10) includes a vertically mounted probe shaft (42) which is preferably counterbalanced by an air counterbalance system (100). The automatic failsafe protection system (200) insures that, in response to a loss of air pressure (or in response to other possibly unsafe conditions), the vertically-mounted, air-counterbalanced probe shaft (42) will be prevented from falling down uncontrollably. The failsafe protection system (200) includes a pair of members (230, 240), with each member mounted adjacent to and on opposite sides of the probe shaft (42) and urged toward engagement with probe shaft by a spring (250). Air under pressure from an air cylinder (210) also acts upon the members (230, 240) to bias the members outwardly away from engagement with the shaft when normal (i.e. safe) operating conditions exist. An unsafe operating condition causes a decrease in air pressure from the cylinder (210) which allow the spring (250) to bias the members (230, 240) into contact with the probe shaft (42) to brake its descent by progressively engaging the shaft (42). Additional springs (263, 267) also urge the members (230, 240) into contact with the probe shaft (42) in response to an unsafe condition.

6 Claims, 4 Drawing Figures

COORDINATE MEASURING MACHINE HAVING A FAILSAFE PROTECTION SYSTEM

FIELD OF INVENTION

The present invention relates to improvements in coordinate measuring machines. More particularly, the present invention relates to an improved safety system which automatically prevents a machine failure from allowing an uncontrolled descent of a vertically mounted probe by interfering with the path of the probe to stop the descent of the probe.

BACKGROUND ART

One type of prior art coordinate measuring machine has a vertically-mounted probe shaft, which is movably mounted to a carriage. Such coordinate measuring machines typically have a counterbalance for the probe shaft which may be either of the mechanical, electrical or pneumatic counterbalance type. Some such systems have the disadvantage that they require a source of electricity or air under pressure, and any loss of electrical power or air pressure leaves the machine in a potentially dangerous condition.

Mechanical counterbalances for such vertically-mounted probes are also known. Such systems rely upon a mechanical coupling of a balancing force to the probe. The failure of the coupling or the loss of the force could allow the vertically-mounted probe to descend without control which presents a safety hazard.

In industrial applications, there is a continuing effort to build safety features into machines which otherwise could become health or safety hazards for the personnel operating them. Government agencies have been increasing the responsibility and liabilities of manufacturers and industrial users of machinery which could possibly injure workmen during the operation of the machinery.

In coordinate measuring machine applications, the addition of any significant weight to the moving parts is undesirable as it could increase friction and inertia, leading to less precise measurements. Frequently, the prior art protection systems were absent, unreliable, or large burdensome and heavy, which interfered with the accuracy of measurements.

Accordingly, the prior art coordinate measuring machines have significant limitation and undesirable features.

DISCLOSURE OF THE INVENTION

The present invention overcomes the limitations and undesirable features of the prior art devices while providing a failsafe system which is relatively reliable and inexpensive, while not intering with the functioning of a coordinate measuring machine in normal operation.

The present invention is a coordinate measuring machine (10), having a vertically mounted probe shaft (42), said machine having a pair of members (230, 240), which are mounted on the opposite side of the probe shaft and in close proximity thereto. The members (230, 240) are biased by a spring (250) toward engagement with of the probe shaft and are also coupled to air under pressure (210) by links (220, 222, 224). The force of the air under pressure opposes the action of the spring (250) and biases the members outwardly away from the probe shaft. Under normal operating conditions of the coordinate measuring machine, the members (230, 240) are biased by the air pressure to avoid engaging the probe shaft, but upon loss of air pressure or other failure, the biasing air pressure is removed, allowing the spring (250) to bias the members (230, 240) into contact with the probe shaft (42). The members (230, 240) are mounted to a portion (39) of a carriage to increasingly engage the probe (42) as the probe (42) continues to descend to provide an ever increasing braking force to stop the probe (42).

The members are mounted to apply the braking force by pivoting into the space in which the probe is mounted to interfere with the descent of the probe and progressively brake the continuing descent of the probe shaft.

Other objects and advantages of the present apparatus will be apparent to one skilled in the art in view of the following description and claims and the accompanying drawings.

DETAILED DESCRIPTION OF THE DRAWINGS

Figure 1:
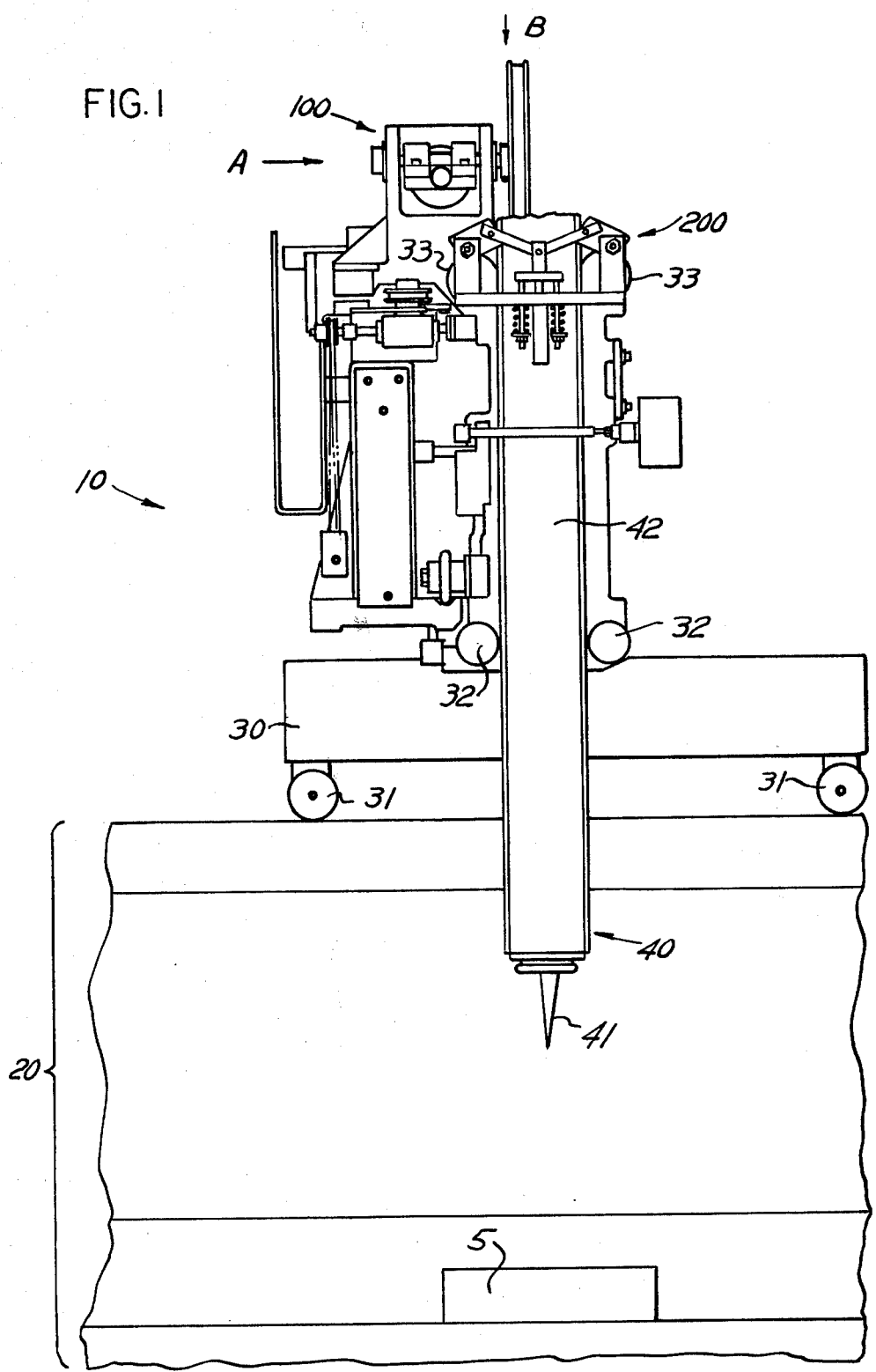
FIG. 1 shows a front view of a portion of a coordinate measuring machine which incorporates the failsafe protection in system of the present invention.

FIG. 1 shows an upper portion of a coordinate measuring machine 10. The coordinate measuring machine 10 includes a base portion 20 and a carriage 30, mounted for vertical movement to the base 20. A vertically mounted probe assembly 40 is movable mounted to the carriage 30 by bearings 32, 33.

The probe assembly 40 includes a replacable probe tip 41 which engages a part 5 to be measured. The probe assembly 40 also includes a probe shaft 42 which extends upwardly from the probe tip 42 and is generally of a larger size than the probe tip.

The probe assembly 40 is adapted to be moved vertically either by an operator or by an automatic control to inspect various portions of the part 5. The machine 10 provides an output indicative of the position of the probe tip 41 at various points in time, representing the coordinates of the various portions of the part 5. The output may either be a display or other suitable record, neither which is shown, but both of which are well known in the art and are only of peripheral interest to the invention disclosed and claimed in this application.

The coordinate measuring machine of the preferred embodiment has an air or pneumatic counterbalance 100 of the type described in a concurrently-filed Patent application Ser. No. 904,171 filed May 8, 1978 entitled "Coordinate Measuring Machine Having An Air Counterbalance System", the specification of which is hereby incorporated by reference. The components of this counterbalance are not shown and are not particularly relevant to the present invention, except that the vertical weight of the probe assembly 40 is counterbalanced by air under pressure, which pressure may be controlled electrically.

A failsafe protection system 200 is shown generally in FIG. 1.

Figure 2:
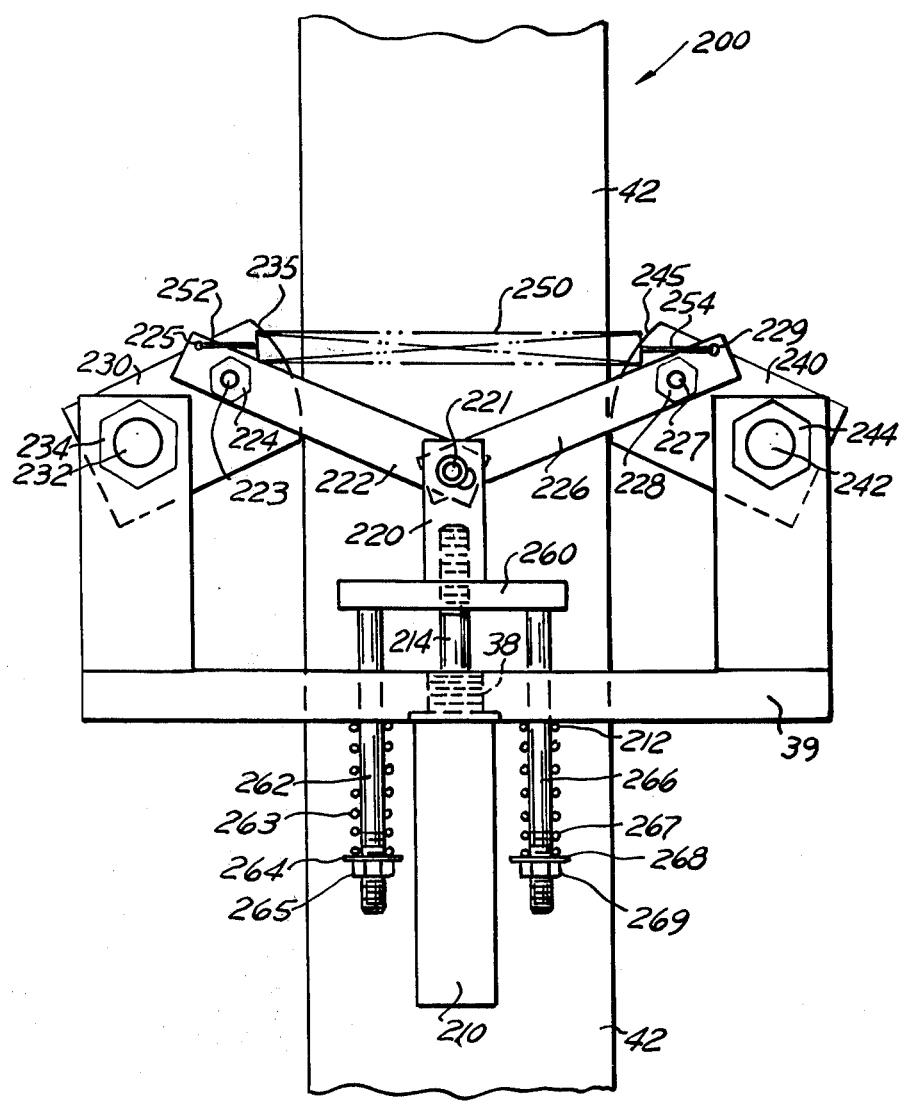
FIG. 2 shows an enlarged view of a portion of the coordinate measuring machine of FIG. 1, with the failsafe protection system in its non-engaged position.

FIG. 2 shows a front view, considerably enlarged, of the failsafe protection system 200 of FIG. 1.

The failsafe protection system 200 includes an air cylinder 210 and two braking pawls or members 230, 240. The braking members are disposed on either side of the probe shaft 42.

In the front view of FIG. 2, the bracket 39 extends in front of the probe shaft 42, with the pawls 230, 240 extending rearwardly from the bracket 39 to engage the sides of the probe shaft 42.

The air cylinder 210 and the two braking members 230, 240 are mounted to a bracket portion 39 of the carriage. The bracket portion 39 is preferably a U-shaped mounting bracket or casting which is securely fixed to the carriage. The portion 39 includes two vertical arms connected by a horizontal cross piece.

The air cylinder 210 includes a set 212 of screw threads which engage a threaded hole 38 in the cross piece of the bracket portion 39.

The air cylinder 210 includes an upwardly extending piston rod 214 which is extended outwardly and upwardly when the cylinder 210 has a normal air pressure (e.g., above 32 psi in a typical application) and which retracts downward when the air pressure in the cylinder 210 is reduced below a normal pressure (e.g., below 32 psi).

The piston rod 214 is coupled to the pawls or members 230, 240 by a yoke 220 and links 222, 226. One end of the one link 222 is fixed to the pawl 230 by a bolt 223 and a nut 224; one end of the other link 226 fixed to the pawl 240 by a bolt 227 and a nut 228. The bolts 223, 227 and nuts 224, 228 mount the pawls 230, 240 to the links 222, 226 to allow rotational movement of both the pawls and the links about the mounting bolt. The other end of the two links 222, 226 is connected to the yoke 220 by a screw 221 through aligned holes in the links 222, 226 and the yoke 220.

Each of the pawls or members 230, 240 is mounted to a respective vertical arm of the bracket 39. The first pawl or member 230 is mounted to one arm of the bracket 39 by a bolt 232 and a hexagonal nut 234. The second pawl or member 240 is similarly mounted to the other vertical arm of the bracket 39 by a second bolt 242 and nut 244. The pawls 230, 240 are mounted to pivot about the bolts 232, 242, respectively.

Each pawl 230, 240 has an arcuate braking surface 235, 245 facing toward the shaft 42.

An extension spring 250 is mounted to the links 222, 226 to bias the pawls 230, 240 inwardly and downwardly. The ends 252, 254 of the spring 250 are inserted through holes 225, 229 of the respective links 222, 226. The spring 250 urges the links 222, 226 inwardly and, by the connection of the links 222, 226 to the pawls 230, 240 with the bolts 232, 242 and the nuts 234, 244, urge the pawls 230, 240 inwardly and downwardly toward the shaft 42.

The piston rod 214 includes screw threads which couple it to threaded holes in the yoke 220 and a support plate 260. The support plate 260 is coupled to retaining rods 262, 266 which extend down through holes in the bracket 39. A first spring 263 is mounted on the retaining rod 262 between a washer 264 held to the rod by a nut 265 on the lower side and the bracket 39 on the upper side. A second spring 267 is mounted on the retaining rod 266 between a washer 268 held to the rod by a nut 269 on the lower side and the bracket 39 on the upper side. The springs 263, 267 urge the rods 262, 266 and the support plate 260 downward.

When air under a normal pressure is applied to the cylinder 210, the support plate 260 is some distance above the cross piece portion of the bracket 39, with the force of the air acting on the piston rod 214 dominating the weaker downward force of the springs 263, 267 which also acts on the support plate 260.

Figure 3:
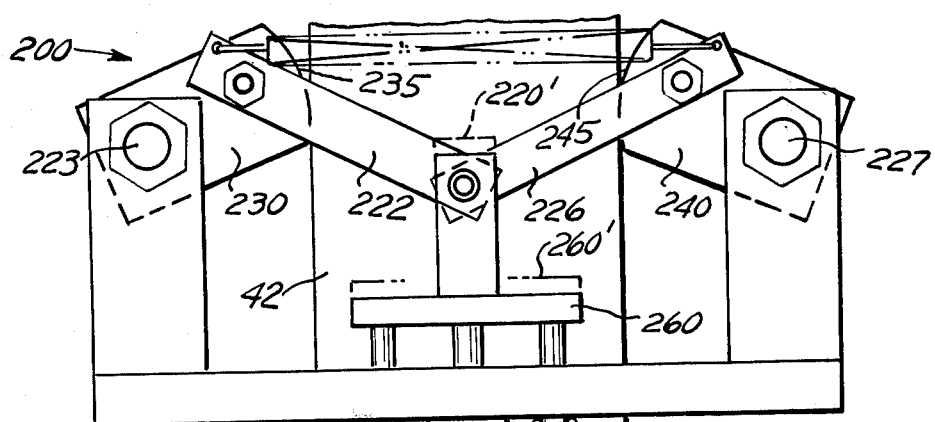
FIG. 3 shows the portion of a coordinate measuring machine shown in FIG. 2, with a portion of the failsafe system beginning to engage the probe shaft as a result of a failure.

FIG. 3 illustrates the failsafe system 200 of the present invention at a point when a failure has been detected and is beginning to stop the downward path of the probe shaft 42.

The detected failure may be a loss of air pressure, which is undesirable in that the air pressure provides the counterbalance for the probe shaft. The same source of air pressure which is supplied to the air counterbalance is supplied to the air cylinder 210. Preferably, the air cylinder 210 (which is part of the failsafe system 200) is adapted to begin braking the descent of the shaft at a smaller loss of pressure than will affect the counterbalance system.

Other "failures" which could be used to activate the failsafe system would include an electrical power loss or a "runaway" situation in which the probe shaft is moved downward at increasing speeds until a dangerous condition exists. By fairly well-known techniques, such "failures" can be detected and can be used to bleed air pressure from the air cylinder 210, as by an electrically actuated valve. Thus, the detection of any failure is used to reduce the air pressure of the air cylinder 210.

Upon reduction of pressure in the air cylinder 210, the springs 263, 267 draw the rods 262, 266 and the support plate 260 downward. The plate 260 moves downward because the downward force applied by the two springs is now greater than the reduced air pressure force acting upward.

The new position of the support plate 260 is shown with solid lines, the previous position (i.e., that of FIG. 2) of the support plate is shown with dotted lines and marked 260'.

The downward movement of the plate 260 moves the yoke 220 downward, which, in turn, moves the connected end of the links 222, 226 down also. The yoke 220 had been in the position marked 220'.

The downward movement of the end of the links 222, 226, which are connected to the yoke 220, causes the other end of the links 222, 226 to pivot about the bolts 223, 227 and pivot the pawls 230, 240 about their respective mountings (i.e. bolts 232, 242) to the bracket 39. The spring 250 also urges the links 222, 226 and connected pawls 230, 240 inwardly toward the probe shaft 42.

The pivoting of the pawls 230, 240 causes the braking surfaces 235, 245 to engage the probe shaft 42. As is shown in FIG. 3, the braking surfaces 235, 245 are just beginning to engage the probe shaft 42.

Unless the condition of failure is removed, the failsafe system continues to progressively engage the probe shaft 42 to stop it.

Figure 4:
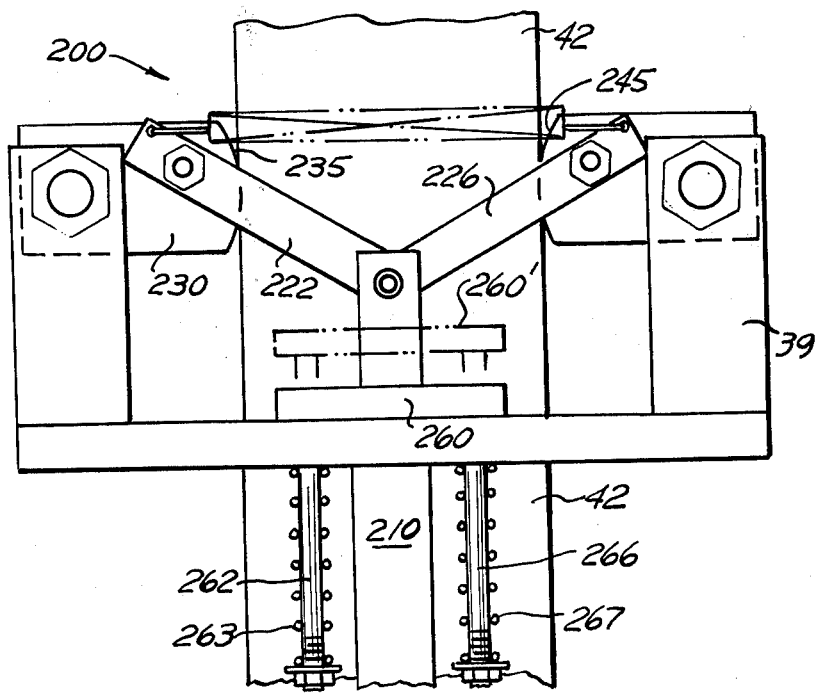
FIG. 4 shows the portion of a coordinate measuring machine when the failsafe system fully engaging the probe shaft.

FIG. 4 shows the complete engagement of the probe shaft 42 by the pawls or braking members 230, 240. The springs 263, 267 have drawn the rods 262, 266 downward, along with the connected support plate 260, until the support plate 260 is resting on the bracket 39. The yoke 220 has moved downward with the one end of the links 222, 226; the other end of the links 222, 226 pivot the pawls 230, 240, respectively, into full engagement of the braking surfaces 235, 245 with the shaft 42. The spring 250 assists in pivoting the pawls 230, 240 and in holding the braking surfaces 235, 245 in contact with the probe shaft 42.

The arcuate shape of the braking surfaces 235, 245 is selected to provide for progressive engagement of the shaft by the braking surfaces as the pawls 230, 240 are rotated. This progressive engagement provides either a greater interference with the space in which the probe shaft moves or by applying a greater pressure on the probe shaft to slow it down first and ultimately to stop it.

While a preferred embodiment of the invention has been disclosed, it will be appreciated by those skilled in the art that the foregoing embodiment might be modified or changed to advantage, or that some of the features might be used without others. For example, while two oppositely located pawls have been disclosed, in some applications only one might be required, while in other instances, three or more pawls might be used. Further, while air pressure has been advantageously used to bias the pawls outwardly, in some applications an electromagnetic solenoid might be useful. Accordingly, the foregoing description and the appended drawings are intended only as illustrative of the present invention to illustrate the principles of the invention and not to limit the scope thereof.

Having thus described the invention, what is claimed:

1. In combination with an apparatus for measuring coordinates on a part, said apparatus being of the type having a base; a carriage mounted to the base for horizontal movement with respect to said base; a probe for engaging the part for measuring its coordinates, said probe including a portion extending vertically and mounted to said carriage to allow vertical movement of the probe with respect to said carriage, and means for counterbalancing said vertically mounted probe, the improvement wherein said apparatus additionally includes:

a braking member movably mounted to the carriage and positioned adjacent to the probe, said braking member including an inclined braking surface adapted to engage the probe in an interfering position when the braking member is moved;

means for sensing a failure of the counterbalance system and generating a signal in response to the failure; and means coupled to said braking member and responsive to the sensing means for moving the braking member toward the probe in response to the sensing means, whereby when a failure of the counterbalance is sensed by the sensing means which moves the braking member into an interfering position with respect to the probe to stop the downward movement of the probe.

2. A measuring apparatus of the type described in claim 1 wherein the counterbalancing means includes a source of pressurized fluid exerting a force which is coupled to the probe to support the probe, and said sensing means includes means for sensing a low fluid pressure.

3. A measuring apparatus of the type described in claim 2 wherein the means for sensing a low fluid pressure is a fluid cylinder which is coupled to the pressurized fluid and which, when the fluid pressure is below a predetermined level, causes the braking member to be engaged.

4. A measuring apparatus of the type described in claim 2 wherein the pressurized fluid is air.

5. A measuring apparatus of the type described in claim 1 wherein the apparatus includes a second braking member positioned adjacent to the probe and on the opposite side of the probe from the other braking member, said second braking member movable mounted to the carriage and having an inclined braking surface adapted to engage the probe when the member is moved, with said second braking member also being coupled to the moving means.

6. A measuring apparatus of the type described in claim 1 wherein the braking member is mounted to the carriage with the inclined braking surface positioned to engage the probe with a progressively greater force as the member is moved further and the moving means is adapted to move the member progressively further until the downward movement of the probe is stopped.

* * * * *